US00RE37482B1

(19) United States
(12) Reissued Patent
Guay et al.

(10) Patent Number: US RE37,482 E
(45) Date of Reissued Patent: Dec. 25, 2001

(54) PORTABLE POWER SUPPLY

(75) Inventors: Etienne Guay, Oxford; André Côté, Montreal, both of (CA)

(73) Assignee: Century Mfg, Co., St. Paul, MN (US)

(21) Appl. No.: 29/095,253

(22) Filed: Oct. 20, 1998

Related U.S. Patent Documents

Reissue of:
(64) Patent No.: Des. 374,859
Issued: Oct. 22, 1996
Appl. No.: 29/018,788
Filed: Feb. 15, 1994 6

(51) LOC (6) Cl. ..... 13- 02
(52) U.S. Cl. ..... D13/110
(58) Field of Search ..... D13/103, 106, D13/110; 307/64–66, 150; 429/96–100, 121, 163, 176, 185, 187; 320/104, 105

(56) References Cited

U.S. PATENT DOCUMENTS

| | | | | |
|---|---|---|---|---|
| D. 235,454 | | 6/1975 | Lindow, Jr. . | |
| D. 316,397 | | 4/1991 | Herbert . | |
| D. 334,560 | | 4/1993 | Wilson . | |
| D. 408,782 | * | 4/1999 | Poon | D13/106 |
| D. 413,098 | * | 8/1999 | Dayan | D13/110 |
| 2,610,987 | | 9/1952 | Betz . | |
| 2,718,540 | | 9/1955 | Betz . | |
| 5,214,368 | | 5/1993 | Wells . | |
| 5,589,292 | * | 12/1996 | Rozon | 429/187 X |
| 5,793,185 | * | 8/1998 | Prelec et al. | 320/104 |
| 5,955,866 | * | 9/1999 | Peng | 320/105 |
| 5,982,138 | * | 11/1999 | Krieger | 320/105 |
| 6,002,235 | * | 12/1999 | Clore | 320/105 |

* cited by examiner

*Primary Examiner*—Joel Sincavage
(74) *Attorney, Agent, or Firm*—Merchant & Gould P.C.

(57) CLAIM

The ornamental design for a portable power supply, as shown and described.

DESCRIPTION

FIG. 1 is a front view of a portable power supply showing my new design;
FIG. 2 is a front and right side perspective view thereof;
FIG. 3 is a top view thereof;
FIG. 4 is a right side view thereof, the left side view thereof being a mirror image [except for the color of the cable and clamp];
FIG. 5 is a front view thereof showing one cable clamp removed from its storage position;
FIG. 6 is a rear view thereof; and,
FIG. 7 is a bottom view thereof.

1 Claim, 4 Drawing Sheets

Figure 3:
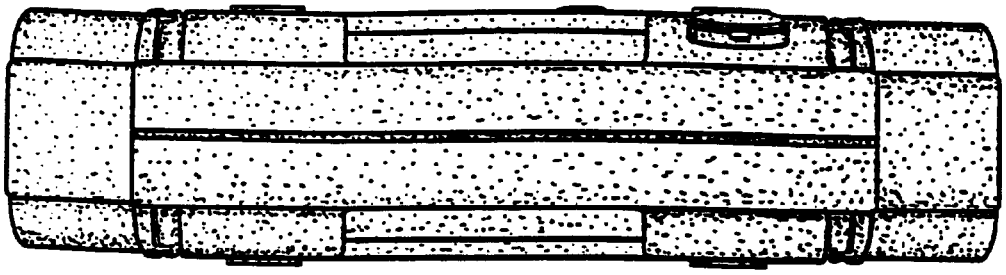
Figure 4:
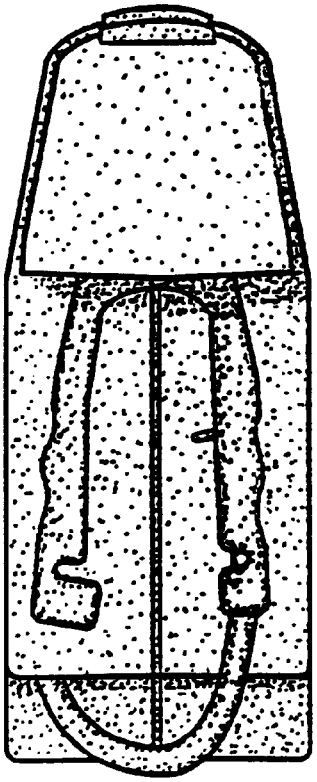
Figure 6:
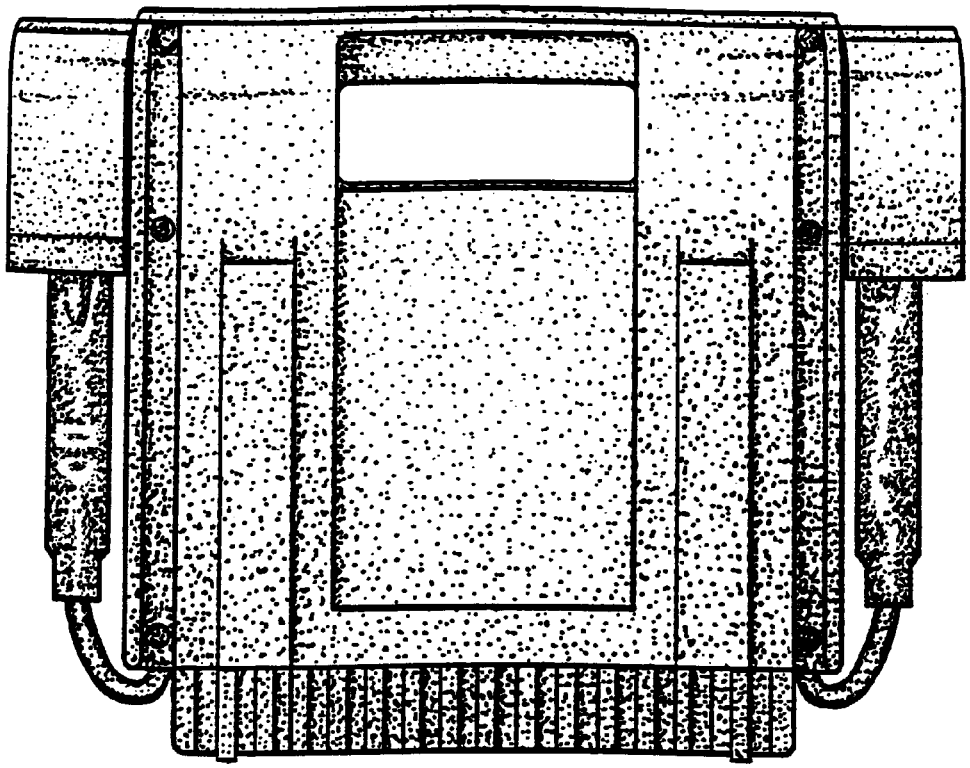
Figure 7:
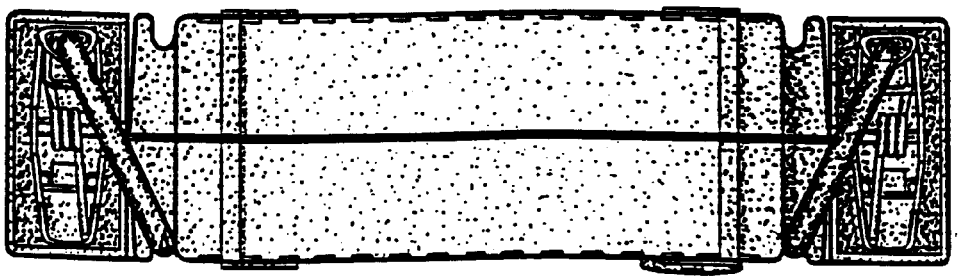

Matter enclosed in heavy brackets [ ] appears in the original patent but forms no part of this reissue specification; matter printed in italics indicates the additions made by reissue.

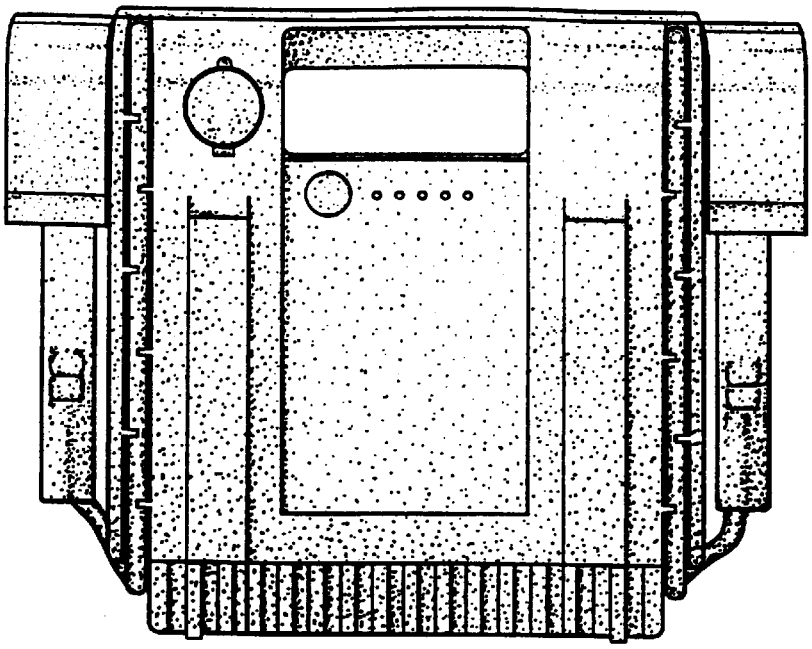
Fig. 1
(AMENDED)
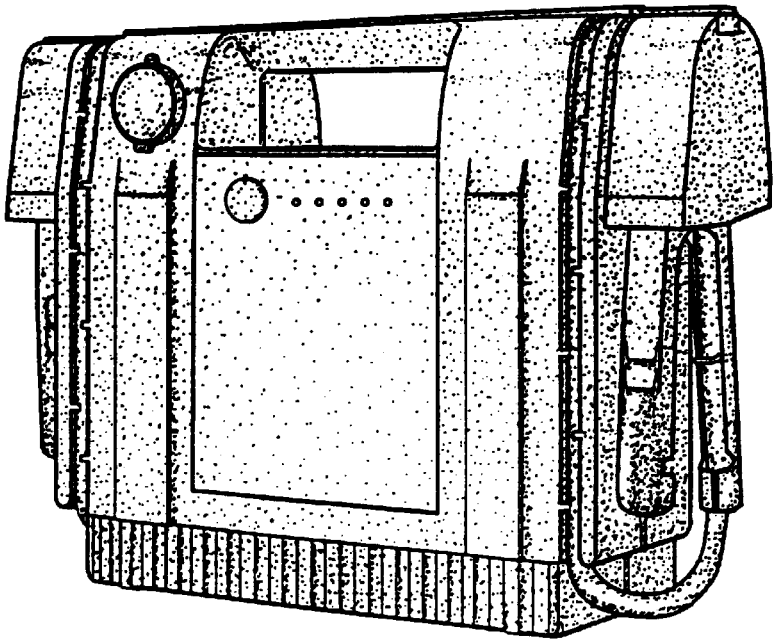
Fig. 2
(AMENDED)

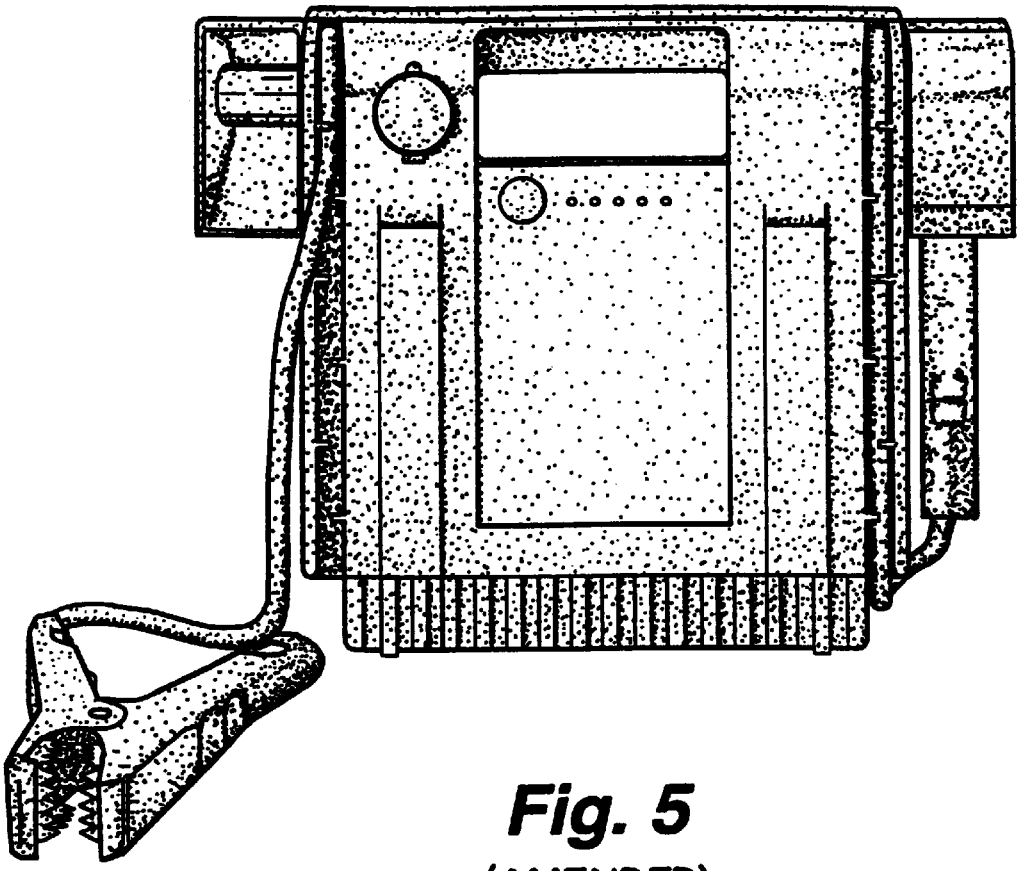
Fig. 5
(AMENDED)